United States Patent
Fabry et al.

(10) Patent No.: US 8,939,336 B2
(45) Date of Patent: Jan. 27, 2015

(54) POLYCRYSTALLINE SILICON PORTION AND METHOD FOR BREAKING A SILICON BODY

(71) Applicant: Wacker Chemie AG, Munich (DE)

(72) Inventors: Laszlo Fabry, Burghausen (DE); Peter Gruebl, Eichendorf (DE); Christian Huber, Burghausen (DE)

(73) Assignee: Wacker Chemie AG, Munich (DE)

( * ) Notice: Subject to any disclaimer, the term of this patent is extended or adjusted under 35 U.S.C. 154(b) by 191 days.

(21) Appl. No.: 13/709,211

(22) Filed: Dec. 10, 2012

(65) Prior Publication Data

US 2014/0004030 A1 Jan. 2, 2014

(30) Foreign Application Priority Data

Dec. 21, 2011 (DE) .......................... 10 2011 089 356

(51) Int. Cl.
*C01B 33/02* (2006.01)
*B26F 3/00* (2006.01)
*C01B 33/035* (2006.01)

(52) U.S. Cl.
CPC ............... *C01B 33/02* (2013.01); *C01B 33/035* (2013.01); *B26F 3/002* (2013.01)
USPC .............................................. 225/1; 423/348

(58) Field of Classification Search
CPC ........ C01B 33/02; C01B 33/035; B26F 3/002
USPC ............. 225/1, 96, 94, 104, 2, 93.5, 96.5, 95; 83/879, 881, 880, 74, 76.8, 886; 65/269; 264/293; 425/404; 126/58
See application file for complete search history.

(56) References Cited

U.S. PATENT DOCUMENTS

| | | | |
|---|---|---|---|
| 3,247,576 A * | 4/1966 | Dill, Jr. et al. | 438/33 |
| 5,101,599 A * | 4/1992 | Takabayasi et al. | 451/165 |
| 5,464,159 A | 11/1995 | Wolf et al. | |
| 7,950,308 B2 | 5/2011 | Atsumi et al. | |

(Continued)

FOREIGN PATENT DOCUMENTS

| | | |
|---|---|---|
| DE | 4218283 A1 | 12/1993 |
| DE | 19749127 A1 | 5/1999 |

(Continued)

OTHER PUBLICATIONS

PatBase abstract for DE 197 49 127 A1 (1999).

(Continued)

*Primary Examiner* — Ghassem Alie
(74) *Attorney, Agent, or Firm* — Caesar, Rivise, Bernstein, Cohen & Pokotilow, Ltd.

(57) ABSTRACT

The invention relates to a polycrystalline silicon portion having at least one fracture surface or cut surface, which includes metal contamination of from 0.07 ng/cm² to 1 ng/cm². The invention also relates to a method for breaking a silicon body, preferably a rod of polycrystalline silicon, including the steps: a) determining the lowest natural bending frequency of the silicon body; b) exciting the silicon body in its lowest natural bending frequency by means of an oscillation generator, the excitation being carried out at an excitation point of the silicon body such that the silicon body breaks at the excitation point; so that a silicon portion having a fracture surface results which includes metal contamination of from 0.07 ng/cm² to 1 ng/cm².

10 Claims, 3 Drawing Sheets

(56) References Cited

U.S. PATENT DOCUMENTS

| | | | |
|---|---|---|---|
| 8,425,279 B2 * | 4/2013 | Gurley et al. | 451/69 |
| 2010/0001106 A1 | 1/2010 | Schaefer et al. | |
| 2010/0154614 A1 * | 6/2010 | Liao et al. | 83/880 |
| 2011/0095062 A1 * | 4/2011 | Maekawa | 225/2 |
| 2012/0052297 A1 | 3/2012 | Pech et al. | |

FOREIGN PATENT DOCUMENTS

| | | |
|---|---|---|
| DE | 102008024411 A1 | 11/2009 |
| EP | 0345618 A2 | 12/1989 |
| EP | 2423163 A1 | 2/2012 |
| JP | 7061808 A2 | 3/1995 |
| JP | 3285054 B2 | 5/2002 |
| JP | 2005288332 A | 10/2005 |
| JP | 2009544564 A | 12/2009 |
| WO | 2009141062 A2 | 11/2009 |

OTHER PUBLICATIONS

PatBase abstract for JP 3285054 B2 (2002).
PatBase abstract for JP 2005288332 (2005).
Fabry et al. "Diagnostic and monitoring tools of large scale Si-manufacturing: trace-analytical tools and techniques in Si-wafer manufacturing." IEEE Transactions on Semiconductor Manufacturing, vol. 9, No. 3, pp. 428-436 (Aug. 1996).

* cited by examiner

POLYCRYSTALLINE SILICON PORTION AND METHOD FOR BREAKING A SILICON BODY

BACKGROUND OF THE INVENTION

The invention relates to a method for breaking a silicon body and to a polycrystalline silicon portion.

In particular, the invention relates to a method for breaking polysilicon rods.

Polycrystalline silicon (polysilicon) is conventionally produced by vapor deposition in a Siemens reactor. Highly pure silane or chlorosilane is in this case deposited on a heated substrate (preferably consisting of silicon) so that solid rods, blocks or slabs are obtained.

Before this polysilicon can be used in crystallization methods, it must be reduced in size. During the ultrapure silicon production process, in various process steps it is necessary to break silicon rods of different cross sections and lengths, in order to introduce them as rod portions or fragments (chips, chunks) as a starting material into other production steps, either directly or after subsequent grinding processes.

In the prior art, in a first step a silicon rod in the form obtained from a Siemens deposition reactor is prebroken using a hand hammer and subsequently manually reduced further to the required fraction size using a rivet hammer. This manually produced coarse fraction as feed material may be further reduced by machine, for example using a jaw crusher or a roller crusher.

The size reduction of relatively long rods, which may be from 2 to 3 m long, should be carried out in such a way that the basic material, i.e. ultrapure silicon, is contaminated as little as possible by the action of mechanical forces and the least possible material losses (fine fraction) are incurred.

When breaking relatively long rods, the breaking tools used should not transfer any unacceptable abrasion particles into the contact surfaces between the tool and the workpiece, and they should act with the lowest possible forces.

Conventional machine breaking methods of construction or mining require high impact forces and hard cutting tool materials.

These always contain material components which are undesirable even in traces for ultrapure silicon applications, because they cause quality problems in further processing steps or directly influence physical semiconductor properties (for example by dopants).

U.S. Pat. No. 7,950,308 B2 discloses a hammer for the manual breaking of polysilicon. The hammer head consists of hard metal. This type of preliminary size reduction leads to undesired contamination with metals, particularly on the surfaces around the region of the impact of the hammer, including the fracture surface, i.e. a new surface which is exposed on a fragment of the previous whole. Furthermore, material losses in the form of fine fragments are incurred.

DE 10 2008 024 411 A1 describes the size reduction of a starting material comprising silicon using pulsed shockwaves: silicon particles having a diameter of from 0.1 μm-1 cm are obtained. For larger fragments or the production of rod fragments, the method is unsuitable.

DE 42 18 283 A1 discloses a method for the contamination-free size reduction of semiconductor material, in particular silicon, the semiconductor material being exposed to shockwaves. Shockwaves are transmitted onto the semiconductor material through water as a transfer medium. The generation of the shockwaves may be carried out at the focal point of a semi-ellipsoid reflector by electrical discharge between two electrodes. Fragments of different size are obtained.

Expediently, the semiconductor material is exposed to shockwaves until a desired limit size of the fragment is reached or fallen below.

For preliminary size reduction or the generation of rod portions of defined size, the method is not suitable.

DE 197 49 127 A1 describes a method of preparing for the size reduction of a crystal in rod form, an impulse which has an impact effect being transmitted onto the crystal. Mechanical striking tools or shockwaves are used in this case. The impulse may be transmitted through a liquid jet. Microcracks are then formed, which are intended to facilitate subsequent breaking.

The size reduction of a silicon rod by thermal shock is likewise known. To this end, JP3285054 A uses laser heating. A disadvantage with this method is that diffusion processes are initiated at high temperatures. In this case, at least some of the surface contaminations, in particular extraneous metals, enter the bulk of the rod or the fragments and are removed from subsequent surface cleaning/etching.

All preliminary size reduction steps known from the prior art are thus associated with high energy consumption, sometimes high equipment outlay, but above all loss in the form of fine fragments as well as undesired contamination of the workpiece to be broken.

The object of the invention is based on this problem.

SUMMARY OF THE INVENTION

The object of the invention is achieved by a polycrystalline silicon portion having at least one fracture surface or cut surface, having metal contamination of from 0.07 ng/cm$^2$ to 1 ng/cm$^2$.

A silicon portion having a low contamination of this type on the fracture surface or cut surface can be produced by the method according to the invention as explained below.

A fracture surface or cut surface in the context of the invention is intended to mean a new surface, including an initial crack or initial break, of a silicon portion, which is exposed, or results, on a silicon body by a size reduction, breaking or cutting process and was previously located in the interior (bulk) of the silicon body.

Preferably, the polycrystalline silicon portion comprises contamination of from 0.07 n g/cm$^2$ to 0.65 ng/cm$^2$, particularly preferably from 0.07 ng/cm$^2$ to 0.32 ng/cm$^2$, on the fracture surface or cut surface.

Preferably, the polycrystalline silicon portion has the following contaminations on the fracture surface or cut surface: Fe 0.01-0.08 ng/cm$^2$, Cu 0.01-0.12 ng/cm$^2$, Ni 0.01-0.06 ng/cm$^2$, Cr 0.01-0.08 ng/cm$^2$, Na 0.01-0.12 ng/cm$^2$, Zn 0.01-0.06 ng/cm$^2$, Al 0.01-0.10 ng/cm$^2$, further surface contaminations of the silicon portion not being detectable.

Particularly preferably, the polycrystalline silicon portion has the following contaminations on the fracture surface or cut surface: Fe 0.01-0.04 ng/cm$^2$, Cu 0.01-0.06 ng/cm$^2$, Ni 0.01-0.03 ng/cm$^2$, Cr 0.01-0.04 ng/cm$^2$, Na 0.01-0.06 ng/cm$^2$, Zn 0.01-0.03 ng/cm$^2$, Al 0.01-0.05 ng/cm$^2$.

In particular, no contaminations are detectable on the surfaces of the silicon portion which do not comprise a fracture surface or cut surface according to the definition mentioned above.

In the case of manual breaking of a silicon body by means of a hammer according to the prior art, significantly higher metallic contaminations occur on the fracture surface (impact point and surface exposed by the breaking).

Preferably, the silicon portion is distinguished by the following total concentrations (bulk and surface) of metals and semimetals:

Cr 0.5-5 pptw, W 0.1-0.5 pptw, Au 0.001-0.1 pptw, Fe 20-50 pptw, Co 0.05-0.3 pptw, Ni 30-70 pptw, Cu 30-50 pptw, Zn 1.5-3 pptw, As 0.05-4 pptw and Sb 0.02-0.6 pptw.

Low metal values of this type have not been achievable in the prior art even by subsequent cleaning methods which are suitable for reducing the surface contaminations.

Bulk concentrations were determined by means of INAA, cf. Table 1.

The so-called "puddle etch test—PET" measurement method was used in order to determine the contaminations on the surface.

This measurement method is disclosed by L. Fabry et al: Diagnostic and Monitoring Tools of Large Scale Si-Manufacturing in IEEE Transactions on a Semicond. Manuf., vol. 9, No. 3, pp. 428-436.

Under a flow hood of cleanroom class ISO<3 (EN ISO 14644-1), 50 μl of hydrofluoric acid ("subboiled" from a PFA distillation system, 50%) is applied onto a relatively flat horizontal position on the fracture surface.

The term "subboiled" is intended to mean: distilled by surface evaporation below the boiling point. PFA=perfluoroalkoxy polymer, a copolymer of tetrafluoroethylene (TFE) and perfluoroalkoxy vinyl ethers.

When the hydrofluoric acid drops have spread to about 10 mm, 200 μl of nitric acid (freshly distilled "subboiled" from a quartz distillation system, 60%) is added at the same position.

After an etching time of 10 min at room temperature, the etching solution can be removed using a p-pipette and its metal content can be determined by means of ICP-MS or GF-AAS.

The object of the invention is also achieved by a method for breaking a silicon body, preferably a rod of polycrystalline silicon,
comprising the steps:
a) determining the lowest natural bending frequency of the silicon body;
b) exciting the silicon body in its lowest natural bending frequency by means of an oscillation generator, the excitation being carried out at an excitation point of the silicon body such that the silicon body breaks at the excitation point;
so that a silicon portion, preferably a polycrystalline silicon portion, having a fracture surface results which comprises metal contamination of from 0.07 ng/cm$^2$ to 1 ng/cm$^2$.

It has been found that the method is suitable for producing polycrystalline silicon portions according to the invention, which have extremely low contamination.

The silicon body to be broken may be a silicon rod, a silicon rod portion or a silicon fragment already reduced in size beforehand.

It is preferably a silicon rod.

It is preferably a rod of polycrystalline silicon.

EXAMPLE 1

4 silicon portions were produced from a polycrystalline silicon rod. A sample from each of the four silicon portions was subsequently studied by means of INAA (instrumental neutron activation analysis).

In INAA measurements, polysilicon samples are irradiated in a nuclear reactor after a cleaning etch of the surface. The metallic contaminations are converted into radioactive isotopes. The decay of the radioactive nuclei, i.e. the gamma radiation, is then measured.

The INAA method has the advantage that it has very low detection limits for most metals. For Fe, Cr and Ni, these are typically 20-50 pg/g [pptw] of silicon.

The INAA method is described in the standard SEMI PV10-1110 (SEMI®, Semiconductor Equipment and Materials International).

Unlike in the standard, the measurement was performed without etching but after washing with ultrapure water.

Table 1 shows the results of the INAA measurements for some selected metals and semimetals (data in pptw).

DETAILED DESCRIPTION OF PREFERRED EMBODIMENTS

The invention makes it possible to excite silicon bodies, such as rods or rod portions, technically in oscillation in such a way that the required contact forces can be minimized by almost two orders of magnitude by using the resonance effect.

This makes it possible to use materials in the contact region which are less contamination-critical (for example PVDF, polyvinylidene fluoride).

TABLE 1

| Element | 01 | 02 | 03 | 04 |
|---|---|---|---|---|
| Na | <186 | <176 | <168 | <181 |
| Cr | 4.4 | 2.5 | 3.2 | 3.0 |
| Fe | <24 | <43 | <23 | <30 |
| Co | <0.054 | <0.19 | <0.047 | <0.068 |
| Ni | <38 | <68 | <35 | <46 |
| Cu | <34 | <41 | <33 | <25 |
| Zn | <1.5 | <2.9 | <1.3 | <2.1 |
| Ga | <0.27 | <0.25 | <0.25 | <0.56 |
| As | 1.8 | 3.4 | 2.0 | 3.4 |
| Ag | <0.27 | <0.50 | <0.32 | <0.44 |
| Cd | <3.3 | <2.6 | <2.2 | <1.9 |
| In | <9.9 | <39 | <3.3 | <15 |
| Sn | <29 | <51 | <55 | <34 |
| Sb | 0.57 | 0.51 | 0.54 | 0.59 |
| Te | <0.75 | <0.88 | <0.81 | <0.51 |
| Ba | <27 | <37 | <27 | <22 |
| Ta | <0.046 | <0.14 | <0.042 | <0.061 |
| W | 0.38 | 0.43 | 0.42 | 0.44 |
| Pt | <76 | <82 | <51 | <36 |
| Au | 0.089 | 0.062 | 0.091 | 0.075 |

Furthermore, it is also advantageous in terms of machine technology to be able to work with smaller forces.

The invention proposes, with suitable mounting, to excite the silicon body by means of an oscillation generator in its lowest natural bending frequency, preferably for only a few seconds, in such a way that it breaks at the excitation point, which also constitutes the maximum of the reciprocating bending stress.

Depending on the nature of the silicon body to be broken, the excitation may be carried out with technically conventional oscillation generators.

These are, by way of example, electrodynamic generators, hydraulic generators or directional unbalance generators.

For the resonance excitation, a measurement process for determining the lowest natural bending frequency is necessary beforehand.

This may be carried out in an automated fashion with technical measurement devices, which determine the natural rod frequency according to the impact method.

The excitation for the breaking process depends on the technical control possibilities of the generators used.

Preferably, it is a swept sine having an excitation bandwidth of +/−5% of the resonant frequency and a frequency variation rate of less than 0.25 dB/octave.

Other excitation signal waveforms (for example: white noise, chirp, burst random, impulse chain, etc.) are likewise usable and preferred.

The introduction of the excitation forces may preferably be carried out by mechanical coupling via coupling bars consisting of a stiff/rigid material, but also by other known coupling methods (for example contactless electromagnetic methods).

Preferably, a polysilicon workpiece in the form of a rod is fastened stably at both ends in the manner of a bridge, with a bottom clearance of at least 20 mm, preferably 20-100 mm, particularly preferably 50-100 mm, above a silicon plate.

An oscillation generator with possible excitation frequencies of from 10 Hz to 300 Hz is mechanically coupled to the rod from above.

Feedback shows the natural resonance of the rod, the rod being excited until it breaks into two pieces (violent oscillation, catastrophic resonance).

The functionality of the method consists in generating high oscillation amplitudes and using the resonance effect of a system which is highly capable of natural bending oscillations, such as a silicon rod constitutes.

The resonant response reaches particularly high values because the material silicon, in a similar way to spring steel, comprises very low natural material damping.

The force application is a factor of 50-100 less than in the case of conventional mechanical breaking methods, which is advantageous.

The advantages of the method according to the invention consist, on the one hand, in that less force application is required and no transfer medium, which may constitute a contamination source, is necessary.

The equipment outlay is low.

Furthermore, extremely low material losses due to the decrease in fine fractions are incurred, as the rod breaks directly along locally formed microcracks. Relatively smooth fracture surfaces are formed.

The method works virtually contamination-free, since substantially lower forces act on the contact surfaces and—which is particularly preferred—materials with lower strength (for example plastics) can be used at clampings and coupling points.

BRIEF DESCRIPTION OF THE DRAWINGS

The invention will be explained in more detail below with the aid of figures.

FIG. 1 schematically shows the structure for carrying out the method.

The silicon rod is clamped on both sides, substantially without a bending moment, in such a way that the bearing forces resulting from the excitation (predominantly in the excitation plane) can be absorbed.

Excitation in the vertical direction is particularly suitable.

After the lowest natural rod bending frequency has been determined, the excitation is carried out.

The silicon rod responds with the dynamic bending line.

Figure 1:
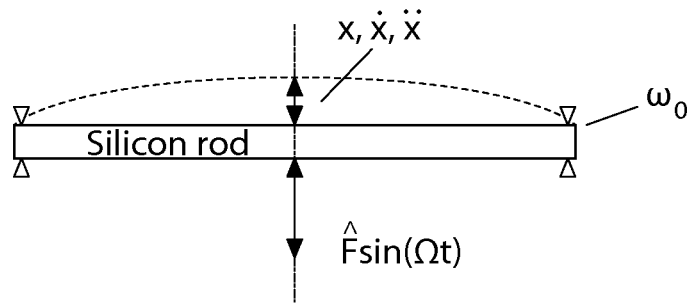
FIG. 1 shows a schematic representation of the invention.

| The maximum values | |
|---|---|
| of the displacement | $X$ |
| the velocity | $\dot{X}$ |
| and the acceleration | $\ddot{X}$ | result at the excitation point (cf. FIG. 1).

By using the resonant response, large deflections can be achieved with small forces, depending on the damping influences.

These cause high reciprocating bending stresses in the edge fibers of the rod and lead to cracking (microcracks), and/or immediately subsequent cleavage, or fracture.

Depending on the mounting and excitation, a body in the form of a rod is capable of natural bending and torsional oscillations. In order to generate high material stresses at a defined point, excitation of the lowest natural bending frequency is most suitable. According to the theory of material strength, this corresponds to the bending beam mounted articulated at both ends with a continuous inertial profile due to intrinsic weight and excitation at half the rod length. In the case of nonsymmetrical bodies, the excitation takes place perpendicularly to the line of the least axial moment of inertia. The oscillation waveform of the rod and static bending line are identical.

The physical model corresponds to the force excitation of the damped spring-mass oscillator.

Figure 2:
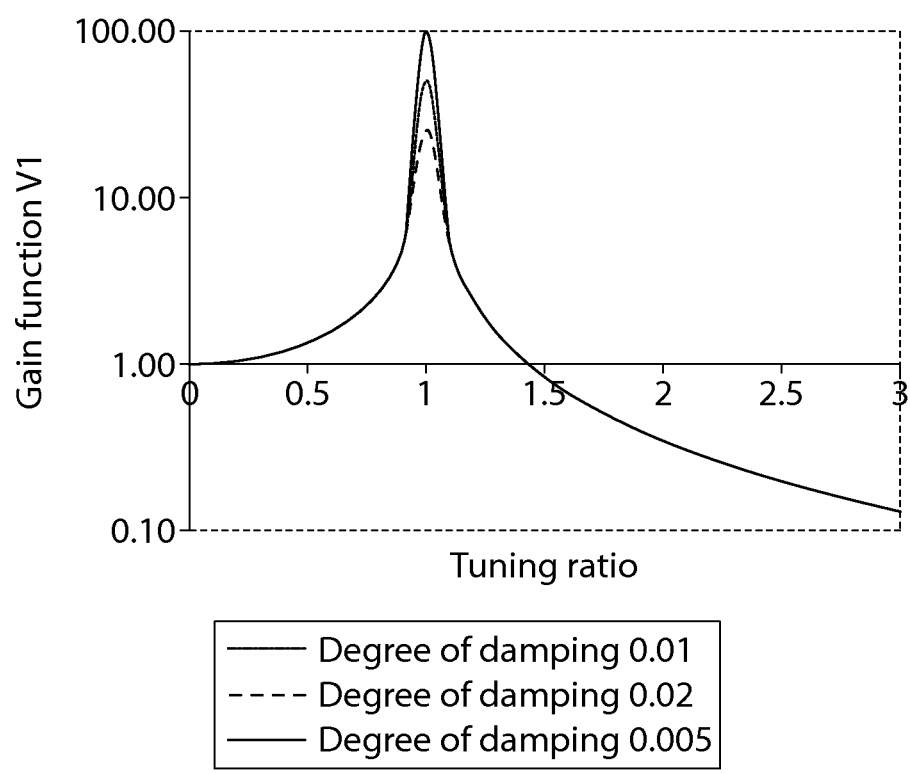
FIG. 2 represents a gain function (resonance curve) as a function of the tuning ratio for three degrees of damping.

FIG. 2 represents the gain function, or resonance curve, as a function of the tuning ratio for three degrees of damping.

The response at the point of resonance is dependent on the system damping which exists. The lower the damping is, the higher is the resonance peak.

The system damping is composed of the internal material damping of the bending carrier, dampings of the mounting system and dampings at the contact points. The internal material damping of crack-free silicon is very low and comparable to that of steel.

The value of the gain maximum at the point of resonance is the factor by which a higher deflection is achieved for the same force as in the static or quasistatic region.

Figure 3:
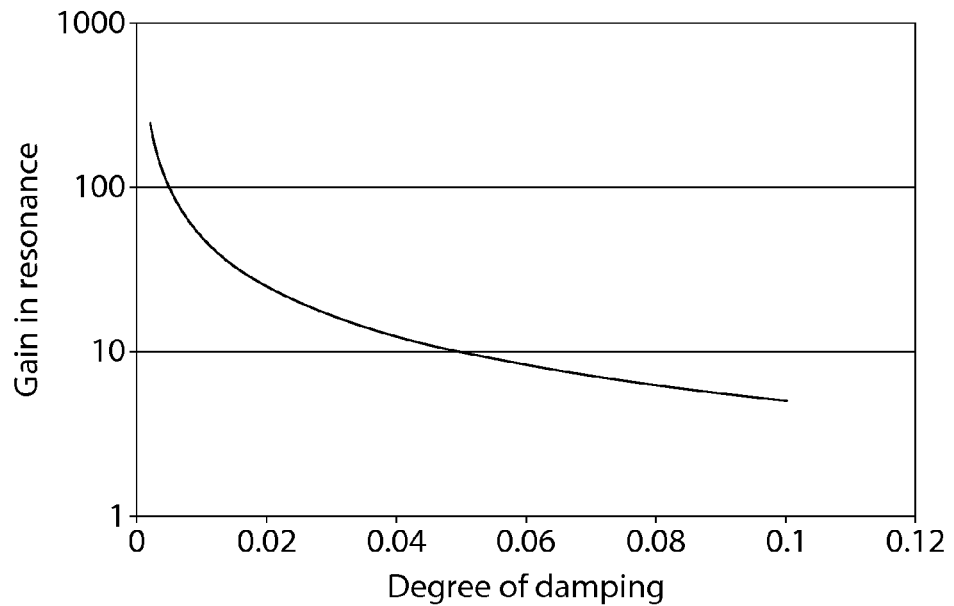
FIG. 3 shows the gain in resonance as a function of the degree of damping.

FIG. 3 shows the gain in resonance as a function of the degree of damping, i.e. the maximum of the damping-dependent gain at the point of resonance.

For polysilicon, depending on the production process, degrees of damping in the range of from 0.001 to 0.005 may be assumed. They do not represent a material constant, but increase with an increasing material stress.

The breaking strength of silicon is up to 7 GPa, depending on the production process.

The determination of the reciprocating bending stress may be based on the procedure for technical ceramics (for example determining the Wöhler curve according to the reciprocating bending test; Weibull statistics; thermal shock behavior).

For highly stressed industrial ceramics, values of from 200 to 300 MPa are known.

The values of silicon are lower and are strongly dependent on the production process and other material properties, such as intrinsic stresses, freedom from cracks, deposition rate, etc.

The reciprocating bending stress decreases with an increasing frequency.

In order to generate a high reciprocating bending stress, a large displacement amplitude is primarily necessary.

The associated oscillation velocities and oscillation accelerations are respectively the single and double integrations of the displacement amplitude with respect to time.

If the rod is one which has a high natural bending frequency (for example more than 200 Hz), with an increasing frequency the oscillation velocities and oscillation accelerations become very high for the same displacement amplitudes.

This can restrict the use of the method.

Conversely, very high oscillation accelerations cause additional loads which can lead to material failure below the reciprocating bending stress.

EXAMPLE 2

A square polycrystalline silicon rod with a length of 1 m and an edge length of 50 mm was broken on an oscillation test stand using an electrodynamic generator.

The rod was clamped in an articulated fashion in the excitation direction close to the two rod ends by means of cylindrical rollers in a clamping device. The clamping device, consisting of steel, was mounted substantially without moment by means of a screw connection close to the clamping points on a concrete wall having high mass and stiffness. Quick clamps and quick connections allow the rod to be clamped more rapidly.

Centrally horizontally, the silicon rod was set in bending oscillation over a regulated oscillation test stand by means of an electrodynamic generator. The coupling of the silicon rod was carried out mechanically via a clamp with line contact.

For better representation and evaluation, a sinusoidal excitation force of constant size was applied in a frequency range in the vicinity of the expected resonant frequency.

The excitation was applied as a swept sine having a defined frequency variation rate (here 0.25 octave/min).

The excitation force was regulated by means of a force sensor, which was integrated into a coupling bar consisting of a stiff-rigid material.

On the workpiece, the oscillation response was measured by means of an acceleration sensor.

The excitation force was increased until cracking took place.

For test purposes, a running time of about two minutes was selected, in order to be able to record the gain function in a wider range.

In practice, with a known resonance position, a time of from a few seconds to less than 1 minute is necessary, typically about 10 seconds.

Figure 4A:
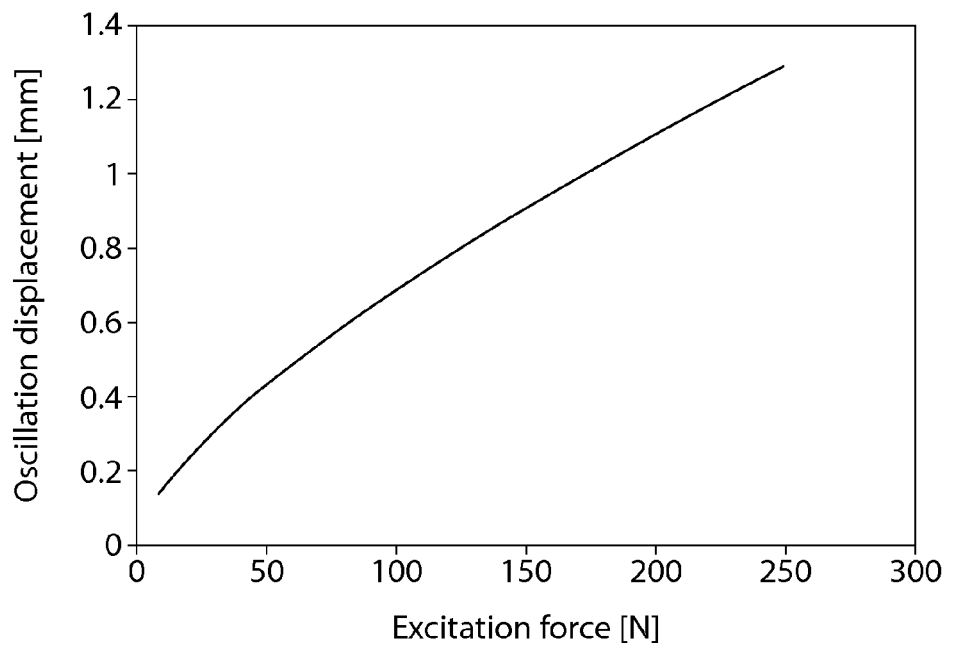
FIGS. 4 A-C represent the oscillation response at the point of resonance as a function of the excitation force as an oscillation displacement (A), oscillation velocity (B) and oscillation acceleration (C).
Figure 4B:
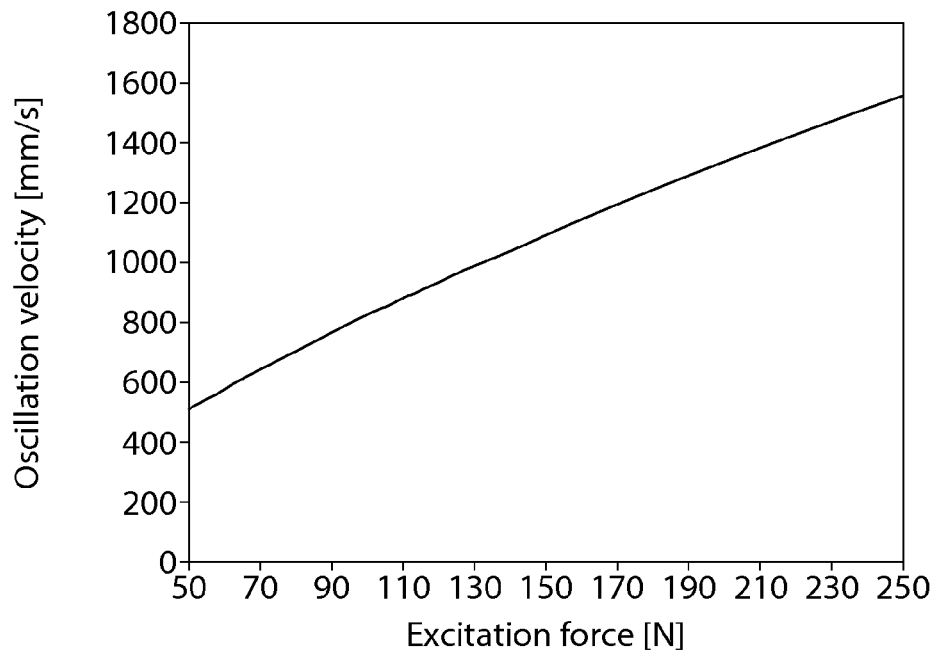
Figure 4C:
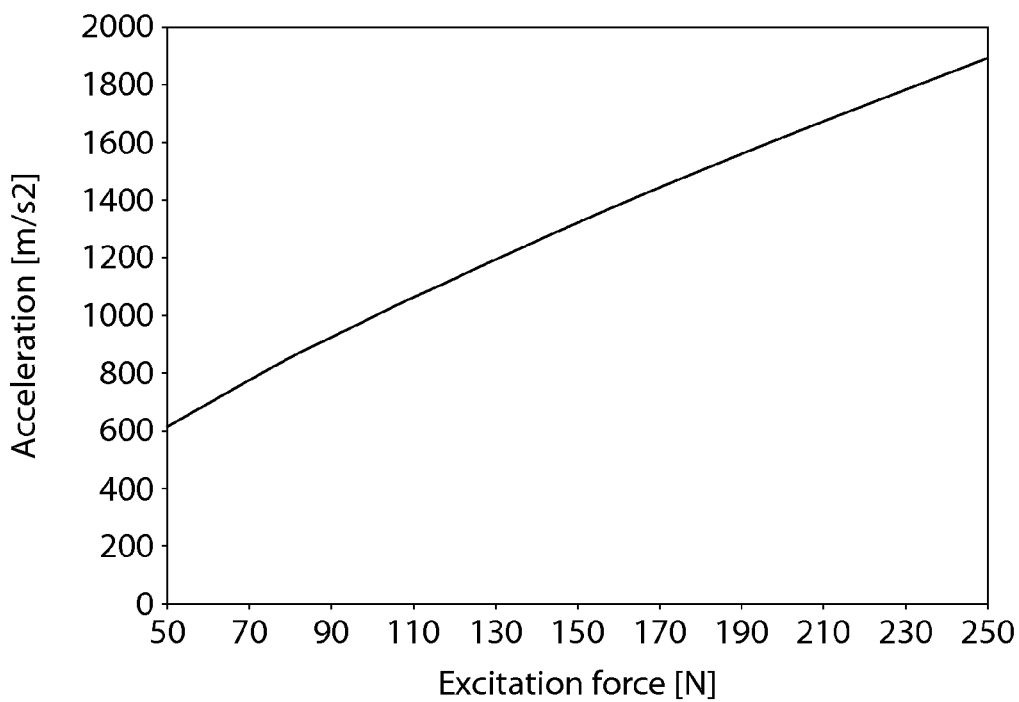

FIGS. 4 A-C represent the oscillation response at the point of resonance as a function of the excitation force as an oscillation displacement (A), oscillation velocity (B) and oscillation acceleration (C).

Calculation of the static bending of the sample rod gives, with a load of 250 N, bending of 0.05 mm and therefore a max. material stress of $2.85\ N/mm^2$.

At the resonance, the bending increases to the maximum value of 1.28 mm.

This value formally entails a reciprocating bending stress of $78\ N/mm^2$ and, in combination with the high acceleration of $1900\ m/s^2$, leads to fracture.

In the example, a gain of 27 was found.

The position of the natural frequency corresponds to calculations.

Without coupling of the oscillation generator, a computational lowest natural bending frequency of 214 Hz is found for the test rod. The coupling of the oscillation generator introduces additional masses, which slightly reduce the natural frequency.

The gain falls with forces of more than 200 N, i.e. with stresses shortly before the breaking load, to values just under a factor of 30.

Owing to the very low degree of damping of silicon, gain values of from 50 to 100 were to be expected.

It may be assumed that dampings on the mountings and minor cracks due to multiple runs cause this.

Basically, the results correspond well to technical oscillation calculations.

The configuration of the breaking device according to the invention, with all parameters necessary for the resonant fracture (mounting of the rod, frequency and power of the oscillation generator) can therefore be carried out computationally for different rod dimensions.

The method is particularly advantageous for silicon rods having natural bending frequencies of less than 200 Hz.

The resonant frequencies can be reduced significantly by increasing the mass of the coupling bar of the oscillation generator, so that the application range can also be extended to measurements which would be less suitable for resonant fracture owing to the high natural bending frequency.

What is claimed is:

1. A method for breaking a silicon body, which is a rod of polycrystalline silicon, comprising the steps:
    a) determining a lowest natural bending frequency of the silicon body;
    b) exciting the silicon body in the lowest natural bending frequency by way of an oscillation generator, the exciting step being carried out at an excitation point of the silicon body such that the silicon body breaks at the excitation point;
    wherein a silicon portion having a fracture surface results which comprises metal contamination of from 0.07 $ng/cm^2$ to at most 1 $ng/cm^2$.

2. The method as claimed in claim 1, wherein the oscillation generator is an electrodynamic generator, a hydraulic generator or a directional unbalance generator.

3. The method as claimed in claim 1, wherein the lowest natural bending frequency of the silicon body is determined by an impact method.

4. The method as claimed in claim 1, wherein excitation forces of the oscillation generator are imparted by mechanical coupling or contactlessly.

5. The method as claimed in claim 1, wherein the silicon body is fastened without bending moment during the exciting step.

6. The method as claimed in claim 1, wherein the silicon body lies 20-100 mm above a silicon plate during the exciting step.

7. The method as claimed in claim 2, wherein the lowest natural bending frequency of the silicon body is determined by an impact method.

8. The method as claimed in claim 7, wherein excitation forces of the oscillation generator are imparted by mechanical coupling or contactlessly.

9. The method as claimed in claim 8, wherein the silicon body is fastened without bending moment during the exciting step.

10. The method as claimed in claim 9, wherein the silicon body lies 20-100 mm above a silicon plate during the exciting step.

* * * * *